Patented Nov. 15, 1949

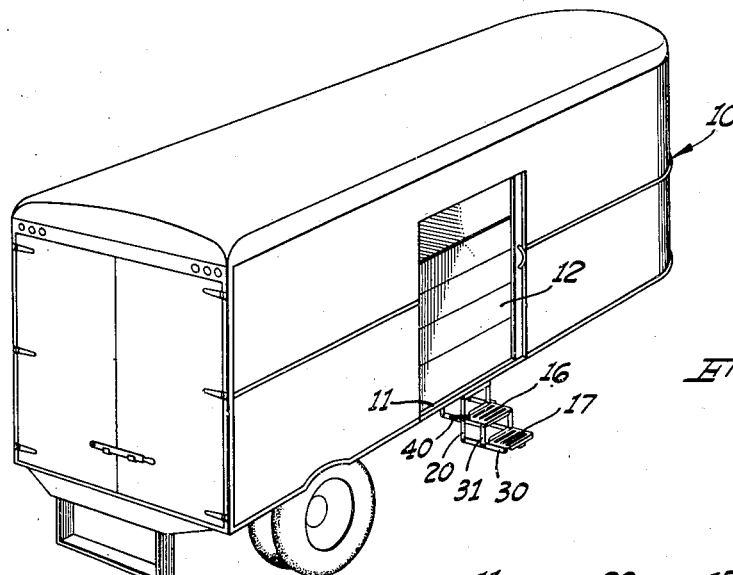
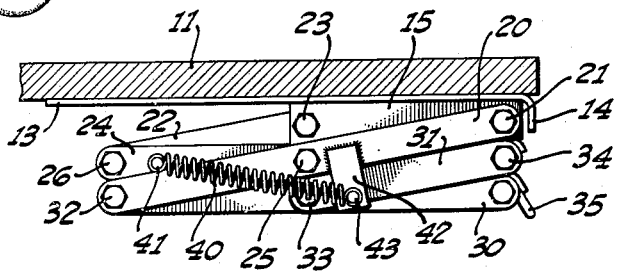
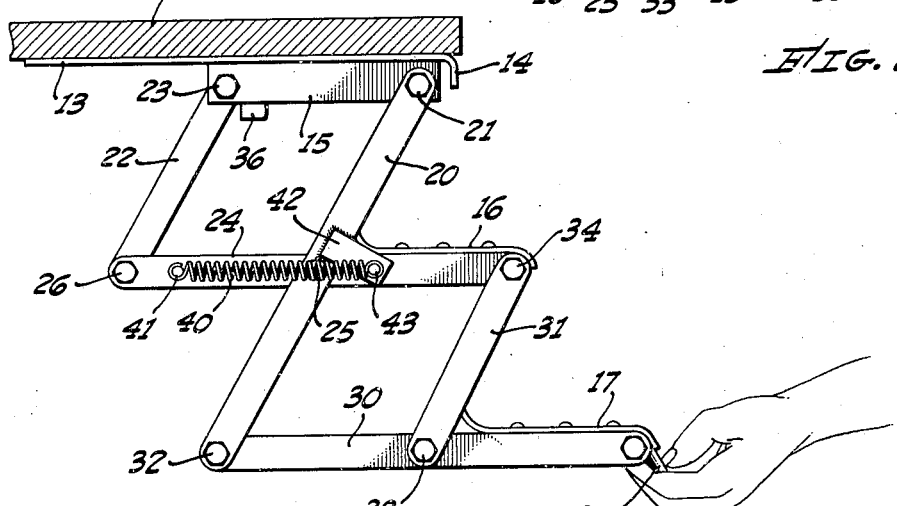

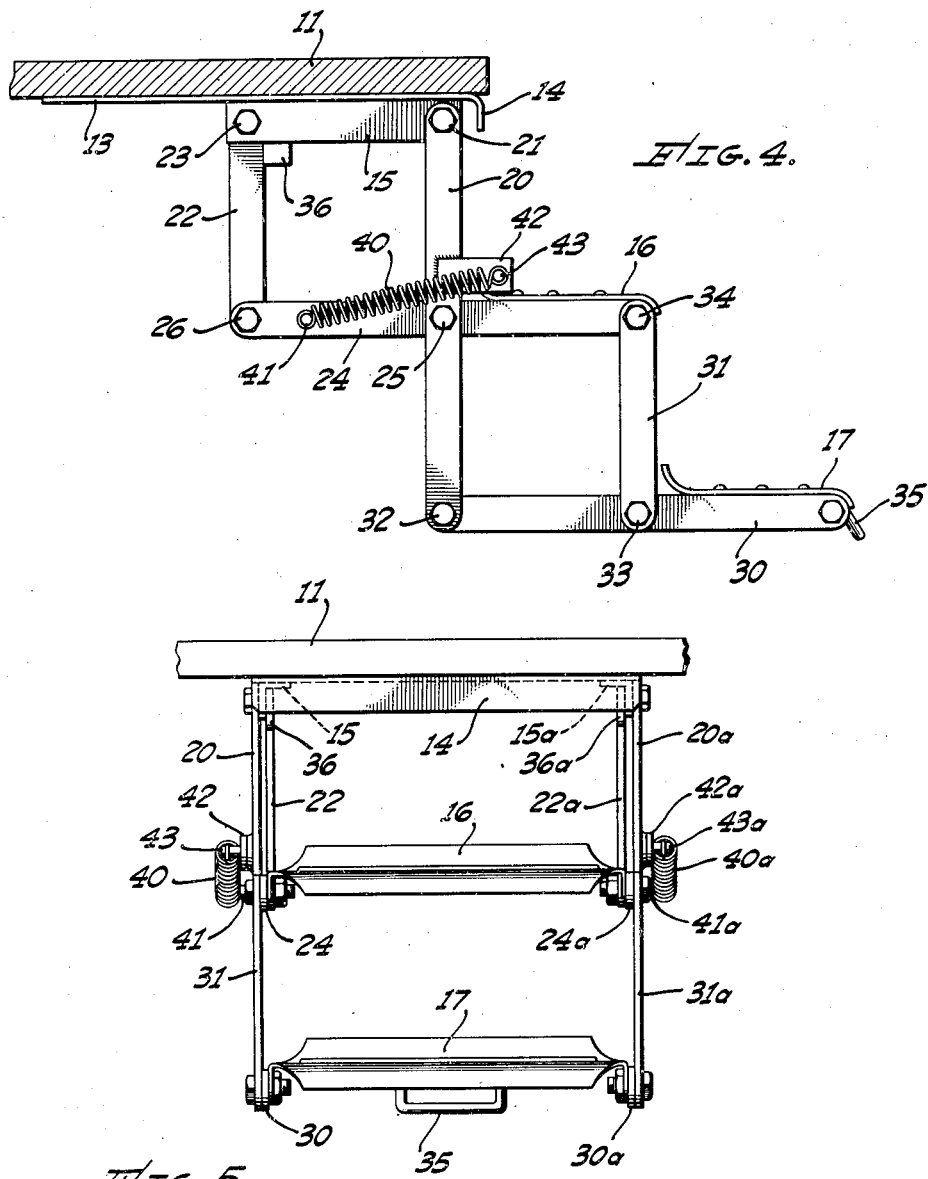

2,487,921

UNITED STATES PATENT OFFICE 2,487,921

RETRACTABLE STEP

Perrin C. Culver, South Gate, Calif., assignor to
Arthur N. Torkelson, Alhambra, Calif.

Application September 11, 1946, Serial No. 696,244

4 Claims. (Cl. 280—166)

My invention relates generally to retractible steps and more particularly to steps adapted for use on vehicles such as trucks, trailers, and similar devices where it is necessary for persons to go from one elevation to another.

As the use of trucks, trailers, and semi-trailers has increased, the need for an easy method of access to these vehicles has likewise increased, so that loading and unloading may be accomplished with greater speed and safety. The floor of such a vehicle is generally at a considerable distance above the ground, and consequently a ramp, steps, or other suitable means must be provided to permit the vehicle to be loaded and unloaded. With the limited space available under certain conditions, a ramp is not always practical, and conventional steps have the same disadvantage in addition to being a hazard to other motorists on the highway. A permanently attached stub ladder has been used under some circumstances, but the natural difficulties of using a ladder have made this method unsatisfactory. Retractible steps have been developed which avoid the objections of space limitations and are much safer to use, but these steps have generally been rather complicated in operation and rather expensive to manufacture.

It is therefore a principal object of my invention to provide a novel and improved retractible step which may be quickly and easily moved from retracted to extended position.

Another object of my invention is to provide a retractible step which has holding means tending to retain the step in either its extended or retracted position, but which may easily be moved from either of those positions when desired.

It is a further object of my invention to provide a retractible step which, while light in weight, is nevertheless sufficiently strong to support both the weight of a man and the freight which he is able to carry.

It is still another object of my invention to provide a step of this type which may be manufactured from standard structural shapes which are readily available and generally inexpensive.

A still further object of the invention is to provide a retractible step which is simple to manufacture and install, and which may be produced at a cost which will render it available to the great mass of truck operators.

These and other objects and advantages of my invention will become apparent from the following description of a preferred form thereof, and from the drawings illustrating that form in which Fig. 1 is a perspective view of a trailer with my improved step mounted thereon, shown in extended position;

Fig. 2 is a side elevational view of the step in retracted position, showing the method of mounting to the vehicle frame;

Fig. 3 is a similar view showing the step in the process of being extended;

Fig. 4 is a side elevational view of the step in completely extended position; and Fig. 5 is an end elevational view of the step in extended position ready for use.

Referring now to the drawing, and particularly to Figs. 1 and 3 thereof, the numeral 10 indicates generally a vehicle such as a trailer having a floor or bed 11 at a considerable distance above the ground. Such vehicles are normally provided with doors 12 or access openings through which a person may gain entrance to the vehicle, and my improved step will normally be placed immediately below such a door. To support the step, a bearing plate 13 is held to the under surface of the floor 11 by bolts (not shown) or other suitable attaching means. The plate 13 is slightly wider than the tread of the retractible step, and is long enough to provide an adequate bearing surface to support the step rigidly. The forward edge of the bearing plate 13 may be provided with a downwardly extending flange 14 to increase the strength of the assembly and provide a more finished appearance, and along each of the sides of the bearing plate I mount supporting angles 15 and 15a with horizontal flanges extending inwardly toward each other along the lower surface of the bearing plate, and with vertical flanges extending downwardly therefrom.

As indicated in Figs. 1 and 5, my improved retractible step comprises a pair of linkage assemblies attached to the angle bars 15 and 15a with tread plates 16 and 17 extending between the linkage assemblies. Since the two linkage assemblies are mirror images of each other, only one of them will be described in detail, it being understood that the other assembly is similarly constructed.

Pivotally attached to the forward end of the supporting angle 15 on the outer surface of the vertical flange thereof is a primary vertical link 20, it being understood that in this specification and claims the term "vertical" describes the position of a member when the retractible step is in its extended position. The primary vertical link 20 may be held to the outer surface of the supporting angle 15 by a bolt 21 or other suitable attaching means, and a shorter vertical link 22 is pivotally attached to the rear end of the supporting angle 15 by a bolt 23, the link 22 bearing against the inner surface of the vertical flange of the supporting angle so that the vertical links 20 and 22 are laterally displaced from each other. The shorter link 22 is approximately one-half the length of primary link 20, and these two links are connected together by a horizontal link 24. As shown in Figs. 3 and 4, the horizontal link 24 is substantially the same length as primary vertical link 20, and these two links are pivotally connected together at their mid-points by a bolt 25 or other suitable means. The rear end of the horizontal link 24 is pivotally attached to the lower end of shorter link 22 by a similar bolt 26 and, it will thus be seen that a parallelogram is formed, having the vertical links 20 and 22 as one pair of parallel sides, while supporting angle 15 and horizontal link 24 form the other pair of parallel sides.

Pivotally attached to the lower end of primary vertical link 20 is a lower horizontal link 30 of substantially the same length as the upper horizontal link 24 and primary vertical link 20; and a short vertical link 31 is pivotally attached to the forward end of upper horizontal link 24 and the mid-point of lower horizontal link 30. The pivotal connection of links 20 and 24 to links 30 and 31 may be made by bolts 32, 33, and 34 and a second parallelogram is thereby formed having parallel vertical sides formed by links 20 and 31, and parallel horizontal sides formed by links 24 and 30. The linkage assembly thus described comprises one of the two assemblies previously mentioned, the elements of the other assembly being indicated in Fig. 5 and given similar numerals to which the letter "a" has been added. Tread member 16 is welded or otherwise firmly attached to the forward halves of the upper horizontal links 24 and 24a, and tread member 17 is similarly attached to the forward halves of the lower horizontal links 30 and 30a. The tread members 16 and 17 firmly connect the two linkage assemblies, as does the bearing plate 13, and the tread members are thus firmly supported. Since the floor or bed 11 of the vehicle 10 is usually horizontal, the supporting angles 15 and 15a are likewise horizontal, and the parallelogram construction previously described insures that the upper and lower horizontal links 24 and 30 will remain horizontal at all times, as will the treads 16 and 17.

As shown in Fig. 4, when the step is in its fully extended position, the vertical links 20, 22, and 31 are perpendicular to the horizontal links 24 and 30, and the treads 16 and 17 are in their lowermost position. The step may be placed in retracted position by pushing rearwardly, to the left in Figs. 2, 3, and 4, on the tread 17 so that the vertical link 20 is pivoted about the bolt 21 in a clockwise direction, and the shorter links 22 and 31 are similarly pivoted about bolts 23 and 34. As this occurs, the parallelogram construction of the links maintains the links 24 and 30 horizontal, while moving them rearwardly, as shown in Fig. 3. At the same time, the horizontal links 24 and 30 and the treads 16 and 17 are moved upwardly until the upper surface of horizontal link 24 bears against the lower surface of supporting angle 15, and the upper surface of horizontal link 30 bears against the lower surface of horizontal link 24. This limiting position is shown in Fig. 2, where it is seen that the step assembly is folded or retracted so that it is against the floor 11 of the vehicle 10 and does not extend outwardly from the latter. To place the step assembly in its extended position, it is only necessary to pull the forward edge of tread 17 downwardly and forwardly as indicated in Fig. 3, and a handle 35 may conveniently be attached to the forward edge of tread 17 for this purpose.

To prevent the step assembly from being extended beyond the position shown in Fig. 4, I provide a stop 36 attached to the rear end of the supporting angle 15, and adapted to bear against the shorter vertical link 22 when the latter is in its lowermost position, as indicated in Fig. 4. The limiting positions of the step assembly are thus clearly defined by the stop 36 and by the bearing of horizontal link 24 against the supporting angle 15. Gravity will tend to move the step assembly to the position shown in Fig. 4, however, and to overcome this difficulty I have provided a biasing means which urges the assembly to either of its limiting positions.

As illustrated in Figs. 2 to 4, I provide a tension spring 40 which has one end thereof pivotally attached to the upper horizontal link 24 near the rear end of the latter by means of a bolt or stud 41. A forwardly projecting arm 42 is welded or otherwise securely attached to the primary vertical link 20 above the mid-point of the latter, and a bolt or stud 43 is firmly attached to the forward end of the arm. When the step assembly is in its retracted position, the arm 42 projects generally downwardly, as shown in Fig. 2; and when the step is in its extended position, the arm is horizontal. At some intermediate position, however, the stud 43 will be horizontally aligned with stud 41 to produce the maximum extension of spring 40, as shown in Fig. 3. On either side of this position, the spring 40 will be extended a smaller amount, this extension being the least when the step assembly is in one of its limiting positions. From this it will be seen that when the step is in its extended position with spring 40 and stud 43 located as shown in Fig. 4, the spring urges the primary vertical link 20 in a counter-clockwise direction and causes the shorter vertical link 22 to bear against stop 36, thereby holding the step extended. When the step is in the retracted position shown in Fig. 2, the spring 40 urges the primary vertical link 20 in a clockwise direction to maintain the step in retracted position. The change from clockwise to counter-clockwise urging occurs as the stud 43 moves above the extension of the line joining stud 41 and bolt 25. I have thus provided an over-center spring mechanism which biases or urges the step assembly to either of its limiting positions, thereby holding the assembly in its retracted position against the urging of gravity, and holding the assembly in its extended position against accidental movement by scraping of the feet, etc.

It will be seen that my improved retractible step lends itself very well to mass production since the primary link 20 and the horizontal links 24 and 30 are of the same length, and have holes therein at the same relative position. These members may therefore all be formed by the same dies, and the arm 42 then welded to the vertical link 20 and a hole formed in the horizontal 24 to receive the stud 41. Similarly, the shorter vertical links 22 and 31 are identical and may likewise both be formed by a single set of dies.

It will be noted that when the step assembly is in its extended position, the vertical links 20, 22, and 31 carry only vertical loads and there is thus no tendency for the step to be moved to its retracted position. Furthermore, should there be any such tendency, any retractive movement of the assembly would tend to raise the treads 16 and 17 which would be opposed by the primary downward load on these treads. However, should a vehicle on which the step is installed, back against a loading dock or similar obstruction while the step is in extended position, the step will not be crushed or damaged, but will merely be moved to its retracted position.

It will thus be seen that I have provided an improved retractible step for vehicles, which is rugged and trouble-free, and very simply operated. Furthermore, the step has been designed so that it may be manufactured at a minimum cost, thereby permitting it to be sold at a very reasonable price. It is to be understood, of course, that modifications may be made which do not depart from the spirit of the invention as described herein, and while I have shown and described a preferred form of my invention, I do not wish to be limited to the particular form or arrangement of parts herein described and shown, except as covered by my claims.

I claim:

1. A step mechanism which includes: a parellelogram linkage comprising a pair of parallelograms having common links; a second parallelogram linkage spaced from said first mentioned linkage and comprising a pair of parallelograms having common links; means adapted to attach said linkages to a surface; a tread member attached to said first and second mentioned linkages and extending therebetween, said linkages and said tread member being movable between retracted and extended positions; and biasing means including an over-center spring means connected between said common links, yieldably urging said linkages to either said retracted or extended position.

2. A retractible step mechanism for vehicles which includes: a primary vertical link; a shorter vertical link spaced from said primary link and substantially one-half as long; means adapted to pivotally attach said links to a surface of said vehicle; an upper horizontal link having one end pivotally attached to the lower end of said shorter vertical link, and its mid-point pivotally attached to the mid-point of said primary link whereby a parallelogram is formed; a second shorter vertical link pivotally attached to the free end of said upper horizontal link; a lower horizontal link having one end pivotally attached to the lower end of said primary vertical link, and its mid-point pivotally attached to the lower end of said second shorter link whereby a second parallelogram is formed, and said primary vertical link and said upper horizontal link are common to both said parallelograms; a tread member attached to said upper horizontal link; a tread member attached to said lower horizontal link; a spring pivotally attached to said upper horizontal link; and means pivotally attaching said spring to said primary vertical link to form an over-center biasing means urging said step mechanism to an extended position or to a retracted position.

3. A step mechanism which includes: a supporting member; a linkage pivotally connected to said supporting member to form therewith a first parallelogram having a second parallelogram pivotally connected thereto, said first and second parallelograms each having a pair of linkage members common to the other parallelogram; tread members connected to said first and second parallelograms to remain substantially parallel to said supporting member at all times; and biasing means including an over-center spring means connected between said common links, yieldably urging said common links to rotate with respect to each other, whereby said linkage is selectively urged to either retracted or extended position.

4. A step mechanism which includes: a lazy tongs linkage adapted to be attached to a supporting member for extension and retraction; tread members attached to members of said linkage parallel to said support to remain substantially horizontal at all times; and biasing means including an over-center spring means connected between adjacent relatively pivotal links of said linkage, yieldably urging said linkage to either retracted or extended position.

PERRIN C. CULVER.

REFERENCES CITED

The following references are of record in the file of this patent:

UNITED STATES PATENTS

| Number | Name | Date |
| --- | --- | --- |
| 868,352 | Marr | Oct. 15, 1907 |
| 1,063,643 | Blake et al. | June 3, 1913 |
| 1,168,464 | Beck | Jan. 18, 1916 |
| 1,180,215 | Weiss | Apr. 18, 1916 |
| 1,189,595 | McCarthy et al. | July 4, 1916 |